United States Patent
Wu

(10) Patent No.: US 7,876,082 B2
(45) Date of Patent: Jan. 25, 2011

(54) DC/DC CONVERTER AND SLOPE COMPENSATION CIRCUIT THEREOF

(75) Inventor: Kuo-Hung Wu, Sinshih Township, Tainan County (TW)

(73) Assignee: Himax Analogic, Inc., Sinshih Township, Tainan County (TW)

(*) Notice: Subject to any disclaimer, the term of this patent is extended or adjusted under 35 U.S.C. 154(b) by 393 days.

(21) Appl. No.: 12/195,900

(22) Filed: Aug. 21, 2008

(65) Prior Publication Data

US 2010/0045256 A1    Feb. 25, 2010

(51) Int. Cl.
G05F 3/16    (2006.01)

(52) U.S. Cl. ...................................... 323/315

(58) Field of Classification Search ............ 323/312, 323/313, 314, 315, 316, 317; 327/355, 538
See application file for complete search history.

(56) References Cited

U.S. PATENT DOCUMENTS

| | | | | |
|---|---|---|---|---|
| 7,511,565 B2* | 3/2009 | Seifu et al. | ................... | 327/538 |
| 7,570,099 B2* | 8/2009 | Lin et al. | ................... | 327/356 |
| 2004/0164784 A1* | 8/2004 | Umeda et al. | ................ | 327/355 |
| 2009/0135536 A1* | 5/2009 | Kappes et al. | ................. | 361/57 |

* cited by examiner

*Primary Examiner*—Adolf Berhane
(74) *Attorney, Agent, or Firm*—Thomas, Kayden, Horstemeyer & Risley, LLP

(57) ABSTRACT

A slope compensation circuit includes a first differential pair circuit, a current mirror unit, a first operating current generation circuit, and a transconductance compensation circuit. The first differential pair circuit is connected to a first current source and receives a pair of differential oscillation signals to generate a pair of differential currents corresponding to the differential oscillation signals. The current mirror unit is connected to the first differential pair circuit and mirrors the differential currents. The first operating current generation circuit is connected to the current mirror unit and generates a first operating current including the differential currents. The transconductance compensation circuit stabilizes a quiescent operating point of the first operating current generation circuit and receives the differential oscillation signals to generate an output current multiple times the value of the first operating current.

28 Claims, 2 Drawing Sheets

US 7,876,082 B2

DC/DC CONVERTER AND SLOPE COMPENSATION CIRCUIT THEREOF

BACKGROUND

1. Field of Invention

The present invention relates to a compensation circuit. More particularly, the present invention relates to a slope compensation circuit for current-mode DC/DC converters.

2. Description of Related Art

In conventional current-mode controlled DC to DC (DC/DC) converters, there is usually a slope compensation circuit provided for changing the slope at which a reference signal intersects with a current sense signal. The slope compensation circuit is capable of outputting a slope compensation signal superimposed on the current sense signal, which is used as a control parameter, to avoid "open loop instability" or "sub-harmonic oscillation".

In the past, the slope compensation signal was formed by transforming an oscillation signal from an oscillator and then superimposed on the current sense signal. However, the oscillation signal is referenced to a ground signal when being generated. Once the ground signal is unstable or has glitches, the slope compensation signal will be affected to have offsets and distortion. As a result, the "open loop instability" or "sub-harmonic oscillation" cannot be prevented efficiently, and even the DC/DC converters cannot work well.

SUMMARY

In accordance with one embodiment of the present invention, a slope compensation circuit is provided. The slope compensation circuit comprises a first differential pair circuit, a current mirror unit, a first operating current generation circuit, and a transconductance compensation circuit. The first differential pair circuit is connected to a first current source and receives a pair of differential oscillation signals to generate a pair of differential currents corresponding to the differential oscillation signals. The current mirror unit is connected to the first differential pair circuit and mirrors the differential currents. The first operating current generation circuit is connected to the current mirror unit and generates a first operating current including the differential currents. The transconductance compensation circuit stabilizes a quiescent operating point of the first operating current generation circuit and receives the differential oscillation signals to generate an output current multiple times the value of the first operating current.

In accordance with another embodiment of the present invention, a DC/DC converter is provided. The DC/DC converter comprises a control circuit, a switch and a slope compensation circuit. The control circuit outputs a pulse drive signal. The switch is activated by the pulse drive signal, such that an inductor is charged by an input voltage to deliver an inducting current. The slope compensation circuit receives a pair of differential oscillation signals to generate an output current superimposed by a current sense signal output from a current sense circuit receiving the inducting current, and the superimposition of the output current and the current sense signal is transformed into a feedback signal for controlling the control circuit. The slope compensation circuit comprises a first differential pair circuit, a current mirror unit, a first operating current generation circuit, and a transconductance compensation circuit. The first differential pair circuit is connected to a first current source and receives the differential oscillation signals to generate a pair of differential currents corresponding to the differential oscillation signals. The current mirror unit is connected to the first differential pair circuit and mirrors the differential currents. The first operating current generation circuit is connected to the current mirror unit and generates a first operating current including the differential currents. The transconductance compensation circuit stabilizes a quiescent operating point of the first operating current generation circuit and receives the differential oscillation signals to generate the output current multiple times the value of the first operating current.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
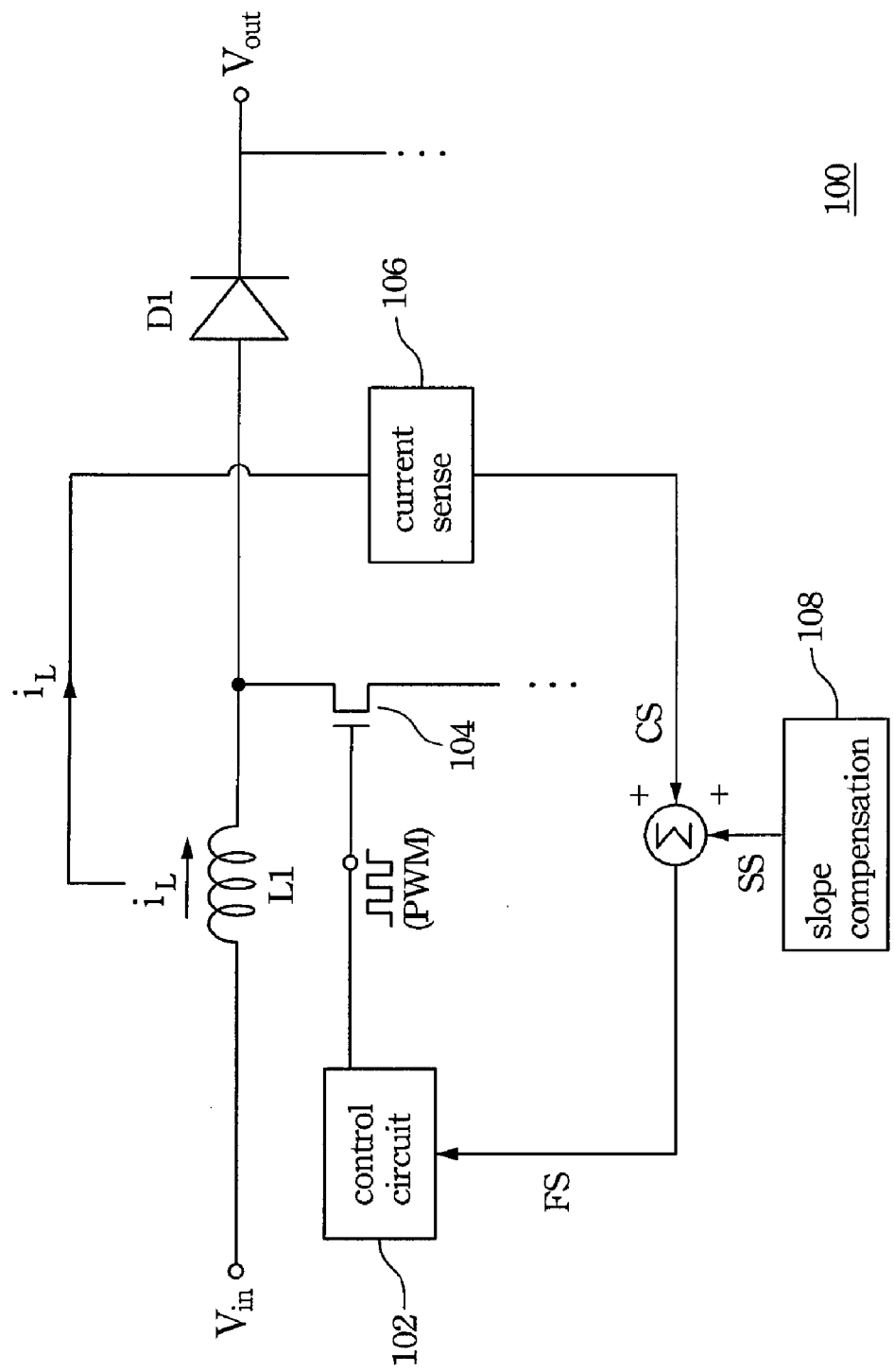
FIG. 1 illustrates a general block diagram of a current-mode DC to DC (DC/DC) converter according to one embodiment of the present invention.

FIG. 1 illustrates a general block diagram of a current-mode DC to DC (DC/DC) converter according to one embodiment of the present invention. The DC/DC converter 100 basically includes an inductor L1, a diode D1, a control circuit 102, a switch 104, a current sense circuit 106, and a slope compensation circuit 108. The inductor L1 has a first end electrically coupled to an input voltage Vin and a second end electrically coupled to the switch 104 and the anode of the diode D1. The inductor L1 is charged by the input voltage Vin to deliver an inducting current $i_L$ when the switch 104 is activated. An output voltage Vout is generated at the cathode of the diode D1.

The current sense circuit 106 receives the inducting current $i_L$ and outputs a current sense signal CS. The slope compensation circuit 108 receives a pair of differential oscillation signals VP and VN (shown in FIG. 2) to generate a slope compensation signal SS superimposed on the current sense signal CS. The superimposition of the slope compensation signal SS and the current sense signal CS is transformed into a feedback signal FS for controlling the control circuit 102. In one embodiment, both the slope compensation signal SS and the current sense signal CS appear in the form of current, and the superimposition of both currents are transformed into a voltage (i.e. feedback signal FS) to control the control circuit 102. The control circuit 102 accordingly outputs a pulse drive signal, which may be in the form of pulse width modulation (PWM), to activate the switch 104.

Figure 2:
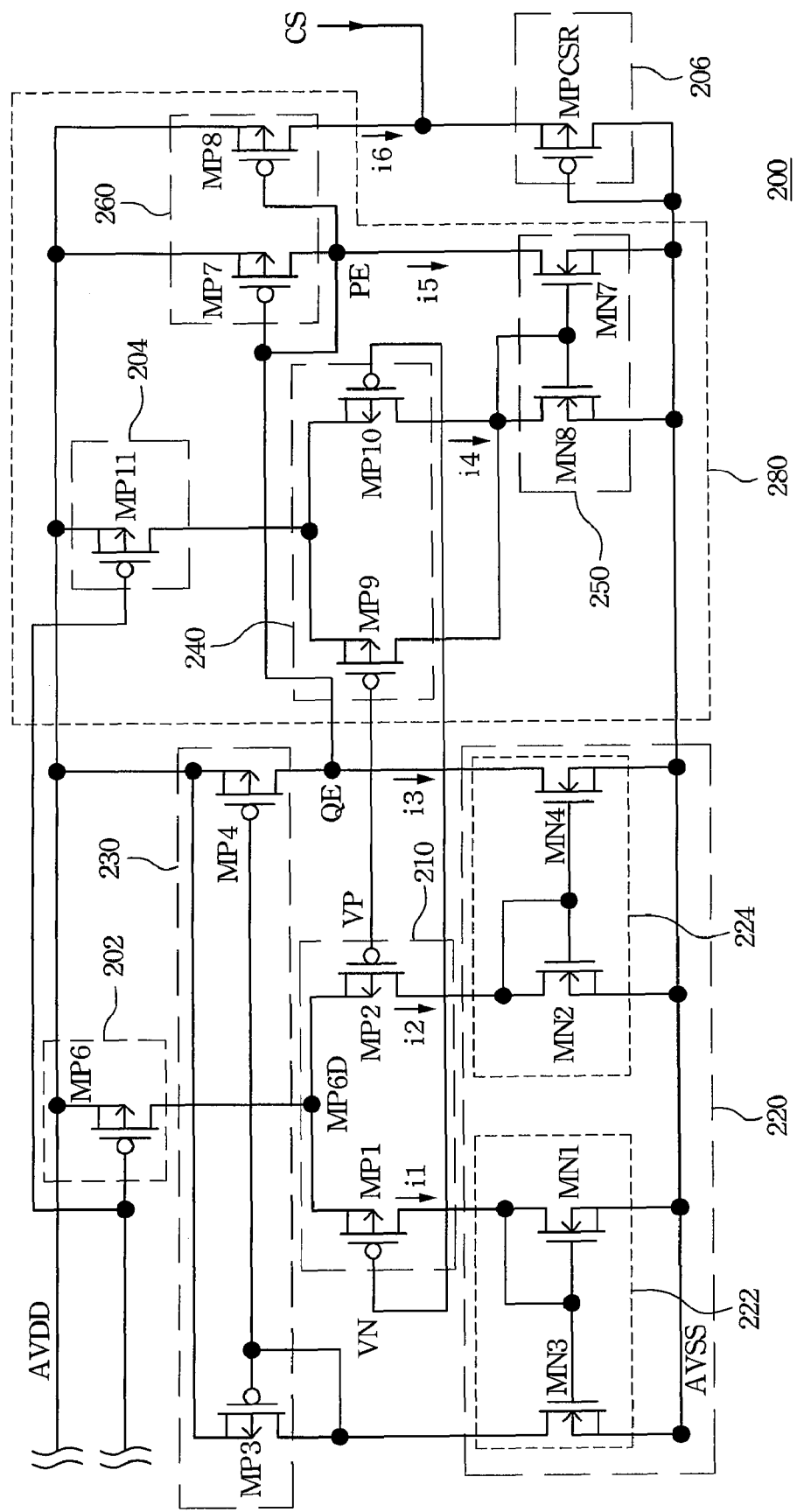
FIG. 2 illustrates a circuit diagram of the slope compensation circuit according to one embodiment of the present invention.

FIG. 2 illustrates a circuit diagram of the slope compensation circuit according to one embodiment of the present invention. The slope compensation circuit 200 includes a first current source 202, a first differential pair circuit 210, a current mirror unit 220, a first operating current generation circuit 230 and a transconductance compensation circuit 280. The first differential pair circuit 210 is electrically connected to the first current source 202 and receives a pair of differential oscillation signals VP and VN, so as to generate a pair of differential currents i1 and i2 corresponding to the differential oscillation signals VP and VN, respectively. Due to the employment of the differential oscillation signals VP and VN, the inputs of the slope compensation circuit can be thus stabilized and more accurate no matter when the oscillation signals have glitches or offsets.

The current mirror unit 220 is electrically connected to the first differential pair circuit 210 and mirrors the differential currents i1 and i2. The first operating current generation circuit 230 is electrically connected to the current mirror unit 220 and generates a first operating current i3 on the basis of the differential currents i1 and i2 mirrored by the current mirror unit 220, such that the first operating current i3 basically includes the differential currents i1 and i2. In other words, the current mirror unit 220 is electrically connected between the first differential pair circuit 210 and the first operating current generation circuit 230 and mirrors the differential currents i1 and i2 from the first differential pair circuit 210 to the first operating current generation circuit 230.

The transconductance compensation circuit 280 stabilizes a quiescent operating point, also known as bias point or simply Q-point (the DC voltage and/or current which causes a device to operate in a certain desired fashion), of the first operating current generation circuit 230 and also receives the differential oscillation signals VP and VN to generate the output signal, e.g. output current i6, which is multiple times the value of the first operating current i3, to be thus superimposed on the current sense signal CS.

In the present embodiment, the transconductance compensation circuit 280 further includes a second current source 204, a second differential pair circuit 240, a current mirror 250 and a second operating current generation circuit 260. The second current source 204 is electrically connected in parallel with the first current source 202. The second current source 204 can be used to provide the same current as which the first current source 202 provides, a different current from which the first current source 202 provides, or a current having a multiple relation with which the first current source 202 provides. In one embodiment, the current provided by the first current source 202 is multiple times the value of the current provided by the second current source 204.

The second differential pair circuit 240 is electrically connected to the second current source 204 and receives the differential oscillation signals VP and VN, so as to generate a differential current i4 corresponding to the differential oscillation signals VP and VN. The current mirror 250 is electrically connected between the second differential pair circuit 240 and the second operating current generation circuit 260 and mirrors the differential current i4 from the second differential pair circuit 240 to the second operating current generation circuit 260. The second operating current generation circuit 260 is further electrically connected to the first operating current generation circuit 230, for example, at the node QE, so as to stabilize the quiescent operating point of the first operating current generation circuit 230, by the cooperation with the second differential pair circuit 240 and the current mirror 250, and to generate the output current i6. The output current i6 is then superimposed on the current sense signal CS and transmitted to a dummy load 206.

In short, the differential oscillation signals VP and VN are employed and inputted into the slope compensation circuit 200, so when one of the differential oscillation signals VP and VN is unstable or has glitches, the quiescent operating point of the first operating current generation circuit 230 may be accordingly unstable; that is, the voltage of the node QE may be changeable such that the first operating current i3 is unsteady. Therefore, the second differential pair circuit 240, the current mirror 250 and the second operating current generation circuit 260 are provided to stabilize the quiescent operating point of the first operating current generation circuit 230 and let the node QE have a stabilized voltage, such that the first operating current i3 can be steady and the output current i6 can be accordingly steady as well.

In one exemplary embodiment, as illustrated in FIG. 2, the first differential pair circuit 210 can further include PMOS transistors MP1 and MP2. The transistor MP1 has a gate receiving the oscillation signal VN, a source electrically connected to the first current source 202, and a drain electrically connected to the current mirror unit 220. The transistor MP2 has a gate receiving the oscillation signal VP, a source electrically connected to the first current source 202, and a drain electrically connected to the current mirror unit 220. Controlled by the differential oscillation signals VP and VN, the transistors MP1 and MP2 can thus be turned on or off and accordingly generate the differential currents i1 and i2, respectively.

Besides, the first current source 202 can further include a PMOS transistor MP6, which has a gate, a source electrically connected to a high power voltage AVDD, and a drain electrically connected to the sources of the transistors MP1 and MP2 at the node MP6D.

Furthermore, the current mirror unit 220 can further include two current mirrors 222 and 224. The current mirror 222 is electrically connected to the transistor MP1 and mirrors the differential current i1. The current mirror 224 is electrically connected to the transistor MP2 and mirrors the differential current i2. Exemplarily, the current mirror 222 can include NMOS transistors MN1 and MN3. The transistor MN1 has a gate and a drain both electrically connected to the drain of the transistor MP1, and a source electrically connected to a low power voltage AVSS. The transistor MN3 has a gate electrically connected to the gate of the transistor MN1, a drain electrically connected to the first operating current generation circuit 230, and a source electrically connected to the low power voltage AVSS.

On the other hand, the current mirror 224 electrically connected to the transistor MP2 is similar to the current mirror 222 electrically connected to the transistor MP1. Exemplarily, the current mirror 224 can include NMOS transistors MN2 and MN4. The transistor MN2 has a gate and a drain both electrically connected to the drain of the transistor MP2, and a source electrically connected to the low power voltage AVSS. The transistor MN4 has a gate electrically connected to the gate of the transistor MN2, a drain electrically connected to the first operating current generation circuit 230, and a source electrically connected to the low power voltage AVSS.

Moreover, the first operating current generation circuit 230 can further include PMOS transistors MP3 and MP4. The transistor MP3 has a gate and a drain both electrically connected to the drain of the transistor MN3, and a source electrically connected to the high power voltage AVDD. The transistor MP4 has a gate electrically connected to the gate of the transistor MP3, a drain electrically connected to the drain of the transistor MN4 at the node QE, and a source electrically connected to the high power voltage AVDD. In another embodiment, the first operating current generation circuit 230 may appear to be another current mirror.

As a result, the differential current i1 is mirrored from the transistor MP1 through the transistors MN1 and MN3 to the transistor MP3 and then further mirrored from the transistor MP3 to the transistor MP4; the differential current i2 is mirrored from the transistor MP2 through the transistors MN2 and MN4 to the transistor MP4. Accordingly, the first operating current i3 including the differential currents i1 and i2 is generated.

In regard to the transconductance compensation circuit 280, the second differential pair circuit 240 can further include PMOS transistors MP9 and MP10. The transistor MP9 has a gate receiving the oscillation signal VP, a source electrically connected to the second current source 204, and a drain electrically connected to the current mirror 250. The transistor MP10 has a gate receiving the oscillation signal VN, a source electrically connected to the second current source 204, and a drain electrically connected to the current mirror 250. Similarly, controlled by the differential oscillation signals VP and VN, the transistors MP9 and MP10 can thus be turned on or off and accordingly generate the current i4.

In conventional analog integrated circuit designs, transistors are formed as multi-fingered devices. In other words, larger sized transistors are made of multiple smaller sized transistors connected in parallel. In one embodiment, the transistors MP9 and MP10 of the second differential pair circuit 240 are each formed having a width/length (W/L) ratio of W/L=8 μm/2 μm, and the transistors MP1 and MP2 of the first differential pair circuit 210 are each formed using 8 fingers (M=8) with each finger having the W/L ratio of W/L=8 μm/2 μm. In other words, both the transistors MP1 and MP2 are eight times the size of the transistors MP9 and MP10. Thus, in the actual physical layout of the first differential pair circuit 210, there are physically 8 PMOS transistors, each having the size of W=8 μm and L=2 μm, connected in parallel to make a single transistor MP1 or MP2.

The second current source 204 can further include a PMOS transistor MP11, which has a gate electrically connected to the gate of the transistor MP6, a source electrically connected to the high power voltage AVDD, and a drain electrically connected to the sources of the transistors MP9 and MP10. In one embodiment, the transistor MP11 of the second current source 204 is formed using 5 fingers (M=5) with each finger having the W/L ratio of W/L=20 μm/1 μm, and the transistor MP6 of the first current source 202 is formed using 40 fingers (M=40) with each finger having the W/L ratio of W/L=20 μm/1 μm. That is, the transistor MP6 is eight times the size of the transistors MP11.

The current mirror 250 can further include NMOS transistors MN7 and MN8. The transistor MN8 has a gate and a drain connected with each other and both electrically connected to the drains of the transistors MP9 and MP10, and a source electrically connected to the low power voltage AVSS. The transistor MN7 has a gate electrically connected to the gate of the transistor MN8, a source electrically connected to the low power voltage AVSS, and a drain electrically connected to the second operating current generation circuit 260.

In addition, the second operating current generation circuit 260 can exemplarily include transistors MP7 and MP8. The transistor MP7 has a gate and a drain connected with each other and electrically connected to the drain of the transistor MP4 at the node QE and electrically connected to the drain of the transistor MN7 at the node PE, and a source electrically connected to the high power voltage AVDD. The transistor MP8 has a gate electrically connected to the drain of the transistor MP7, a source electrically connected to the high power voltage AVDD, and a drain electrically connected to the dummy load 206, in which the dummy load 206 may be presented by a PMOS transistor MPCSR having a gate and a drain electrically connected to the low power voltage AVSS and a source electrically connected to the drain of the transistor MP8.

As a result, the current i4, similar to the differential current i2, is mirrored from the transistors MP9 and MP10 through the transistors MN8 and MN7 to the transistor MP7 as the current i5, and the nodes QE and PE can be operated at the same voltage and stabilized no matter when the differential oscillation signals VP and VN are unstable or have glitches. Besides, the output current i6 can be mirrored from the current i5 and steadily outputted and superimposed on the current sense signal CS.

In accordance with the foregoing embodiments of the present invention, the slope compensation circuit can provide much steadier output signal than usual without being affected by the ground signal. Therefore, the "open loop instability" or "sub-harmonic oscillation" in the DC/DC converter can be avoided efficiently, and the DC/DC converter can thus work very well.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A slope compensation circuit, comprising:
   a first differential pair circuit connected to a first current source and receiving a pair of differential oscillation signals to generate a pair of differential currents corresponding to the differential oscillation signals;
   a current mirror unit connected to the first differential pair circuit and mirroring the differential currents;
   a first operating current generation circuit connected to the current mirror unit and generating a first operating current including the differential currents; and
   a transconductance compensation circuit stabilizing a quiescent operating point of the first operating current generation circuit and receiving the differential oscillation signals to generate an output current multiple times the value of the first operating current.

2. The slope compensation circuit as claimed in claim 1, wherein the transconductance compensation circuit further comprises:
   a second operating current generation circuit connected to the first operating current generation circuit to stabilize the quiescent operating point of the first operating current generation circuit and generating the output current.

3. The slope compensation circuit as claimed in claim 2, wherein the transconductance compensation circuit further comprises:
   a second differential pair circuit connected to a second current source connected in parallel with the first current source and receiving the differential oscillation signals to generate a second differential current corresponding to the differential oscillation signals; and
   a first current mirror connected between the second differential pair circuit and the second operating current generation circuit and mirroring the second differential current from the second differential pair circuit to the second operating current generation circuit.

4. The slope compensation circuit as claimed in claim 3, wherein a current provided by the first current source is multiple times the value of a current provided by the second current source.

5. The slope compensation circuit as claimed in claim 3, wherein the first operating current generation circuit further comprises:
a first transistor having a first terminal connected to a first power voltage, a second terminal connected to the current mirror unit, and a first control terminal connected to the second terminal; and
a second transistor having a second control terminal connected to the first control terminal, a third terminal connected to the first power voltage, and a fourth terminal connected to the current mirror unit and biased by the second operating current generation circuit.

6. The slope compensation circuit as claimed in claim 5, wherein the second operating current generation circuit further comprises:
a third transistor having a third control terminal connected to the fourth terminal of the second transistor, a fifth terminal connected to the first power voltage, and a sixth terminal connected to the third control terminal and the first current mirror; and
a fourth transistor having a fourth control terminal connected to the sixth terminal, a seventh terminal connected to the first power voltage, and an eighth terminal connected to a dummy load.

7. The slope compensation circuit as claimed in claim 6, wherein the first current mirror further comprises:
a fifth transistor having a ninth terminal connected to the second differential pair circuit, a tenth terminal connected to a second power voltage, and a fifth control terminal connected to the ninth terminal; and
a sixth transistor having a sixth control terminal connected to the fifth control terminal, an eleventh terminal connected to the sixth terminal of the third transistor, and a twelfth terminal connected to the second power voltage.

8. The slope compensation circuit as claimed in claim 7, wherein the second differential pair circuit further comprises:
a seventh transistor having a seventh control terminal receiving one of the differential oscillation signals, a thirteenth terminal connected to the second current source, and a fourteenth terminal connected to the ninth terminal of the fifth transistor; and
an eighth transistor having an eighth control terminal receiving the other of the differential oscillation signals, a fifteenth terminal connected to the second current source, and a sixteenth terminal connected to the ninth terminal of the fifth transistor.

9. The slope compensation circuit as claimed in claim 8, wherein the first differential pair circuit further comprises:
a ninth transistor having a ninth control terminal receiving one of the differential oscillation signals, a seventeenth terminal connected to the first current source, and an eighteenth terminal connected to the current mirror unit; and
a tenth transistor having a tenth control terminal receiving the other of the differential oscillation signals, a nineteenth terminal connected to the first current source, and a twentieth terminal connected to the current mirror unit.

10. The slope compensation circuit as claimed in claim 9, wherein both the ninth transistor and the tenth transistor are multiple times the size of the seventh transistor and the eighth transistor.

11. The slope compensation circuit as claimed in claim 9, wherein both the ninth transistor and the tenth transistor are made of multiple of the seventh transistors or the eighth transistors connected in parallel.

12. The slope compensation circuit as claimed in claim 9, wherein the current mirror unit further comprises:
a fourth current mirror connected to the ninth transistor and mirroring one of the differential currents; and
a fifth current mirror connected to the tenth transistor and mirroring the other of the differential currents.

13. The slope compensation circuit as claimed in claim 12, wherein the fourth current mirror further comprises:
an eleventh transistor having an eleventh control terminal connected to the eighteenth terminal of the ninth transistor, a twenty-first terminal connected to the second terminal of the first transistor, and a twenty-second terminal connected to the second power voltage; and
a twelfth transistor having a twelfth control terminal and a twenty-third terminal both connected to the eighteenth terminal of the ninth transistor, and a twenty-fourth terminal connected to the second power voltage.

14. The slope compensation circuit as claimed in claim 12, wherein the fifth current mirror further comprises:
a thirteenth transistor having a thirteenth control terminal and a twenty-fifth terminal both connected to the twentieth terminal of the tenth transistor, and a twenty-sixth terminal connected to the second power voltage; and
a fourteenth transistor having a fourteenth control terminal connected to the twentieth terminal of the tenth transistor, a twenty-seventh terminal connected to the fourth terminal of the second transistor, and a twenty-eighth terminal connected to the second power voltage.

15. A DC/DC converter, comprising:
a control circuit outputting a pulse drive signal;
a switch activated by the pulse drive signal, such that an inductor is charged by an input voltage to deliver an inducting current; and
a slope compensation circuit receiving a pair of differential oscillation signals to generate an output current superimposed by a current sense signal output from a current sense circuit receiving the inducting current, the superimposition of the output current and the current sense signal being transformed into a feedback signal for controlling the control circuit, the slope compensation circuit comprising:
a first differential pair circuit connected to a first current source and receiving the differential oscillation signals to generate a pair of differential currents corresponding to the differential oscillation signals;
a current mirror unit connected to the first differential pair circuit and mirroring the differential currents;
a first operating current generation circuit connected to the current mirror unit and generating a first operating current including the differential currents; and
a transconductance compensation circuit stabilizing a quiescent operating point of the first operating current generation circuit and receiving the differential oscillation signals to generate the output current multiple times the value of the first operating current.

16. The DC/DC converter as claimed in claim 15, wherein the transconductance compensation circuit further comprises:
a second operating current generation circuit connected to the first operating current generation circuit to stabilize the quiescent operating point of the first operating current generation circuit and generating the output current.

17. The DC/DC converter as claimed in claim 16, wherein the transconductance compensation circuit further comprises:

a second differential pair circuit connected to a second current source connected in parallel with the first current source and receiving the differential oscillation signals to generate a second differential current corresponding to the differential oscillation signals; and a first current mirror connected between the second differential pair circuit and the second operating current generation circuit and mirroring the second differential current from the second differential pair circuit to the second operating current generation circuit.

18. The DC/DC converter as claimed in claim 17, wherein a current provided by the first current source is multiple times the value of a current provided by the second current source.

19. The DC/DC converter as claimed in claim 17, wherein the first operating current generation circuit further comprises:

a first transistor having a first terminal connected to a first power voltage, a second terminal connected to the current mirror unit, and a first control terminal connected to the second terminal; and a second transistor having a second control terminal connected to the first control terminal, a third terminal connected to the first power voltage, and a fourth terminal connected to the current mirror unit and biased by the second operating current generation circuit.

20. The slope compensation circuit as claimed in claim 19, wherein the second operating current generation circuit further comprises:

a third transistor having a third control terminal connected to the fourth terminal of the second transistor, a fifth terminal connected to the first power voltage, and a sixth terminal connected to the third control terminal and the first current mirror; and a fourth transistor having a fourth control terminal connected to the sixth terminal, a seventh terminal connected to the first power voltage, and an eighth terminal connected to a dummy load.

21. The slope compensation circuit as claimed in claim 20, wherein the first current mirror further comprises:

a fifth transistor having a ninth terminal connected to the second differential pair circuit, a tenth terminal connected to a second power voltage, and a fifth control terminal connected to the ninth terminal; and a sixth transistor having a sixth control terminal connected to the fifth control terminal, an eleventh terminal connected to the sixth terminal of the third transistor, and a twelfth terminal connected to the second power voltage.

22. The slope compensation circuit as claimed in claim 21, wherein the second differential pair circuit further comprises:

a seventh transistor having a seventh control terminal receiving one of the differential oscillation signals, a thirteenth terminal connected to the second current source, and a fourteenth terminal connected to the ninth terminal of the fifth transistor; and an eighth transistor having an eighth control terminal receiving the other of the differential oscillation signals, a fifteenth terminal connected to the second current source, and a sixteenth terminal connected to the ninth terminal of the fifth transistor.

23. The slope compensation circuit as claimed in claim 22, wherein the first differential pair circuit further comprises:

a ninth transistor having a ninth control terminal receiving one of the differential oscillation signals, a seventeenth terminal connected to the first current source, and an eighteenth terminal connected to the current mirror unit; and a tenth transistor having a tenth control terminal receiving the other of the differential oscillation signals, a nineteenth terminal connected to the first current source, and a twentieth terminal connected to the current mirror unit.

24. The slope compensation circuit as claimed in claim 23, wherein both the ninth transistor and the tenth transistor are multiple times the size of the seventh transistor and the eighth transistor.

25. The slope compensation circuit as claimed in claim 23, wherein both the ninth transistor and the tenth transistor are made of multiple of the seventh transistors or the eighth transistors connected in parallel.

26. The slope compensation circuit as claimed in claim 23, wherein the current mirror unit further comprises:

a fourth current mirror connected to the ninth transistor and mirroring one of the differential currents; and a fifth current mirror connected to the tenth transistor and mirroring the other of the differential currents.

27. The slope compensation circuit as claimed in claim 26, wherein the fourth current mirror further comprises:

an eleventh transistor having an eleventh control terminal connected to the eighteenth terminal of the ninth transistor, a twenty-first terminal connected to the second terminal of the first transistor, and a twenty-second terminal connected to the second power voltage; and a twelfth transistor having a twelfth control terminal and a twenty-third terminal both connected to the eighteenth terminal of the ninth transistor, and a twenty-fourth terminal connected to the second power voltage.

28. The slope compensation circuit as claimed in claim 26, wherein the fifth current mirror further comprises:

a thirteenth transistor having a thirteenth control terminal and a twenty-fifth terminal both connected to the twentieth terminal of the tenth transistor, and a twenty-sixth terminal connected to the second power voltage; and a fourteenth transistor having a fourteenth control terminal connected to the twentieth terminal of the tenth transistor, a twenty-seventh terminal connected to the fourth terminal of the second transistor, and a twenty-eighth terminal connected to the second power voltage.

* * * * *